United States Patent
Hayashi et al.

[11] Patent Number: 6,139,618
[45] Date of Patent: Oct. 31, 2000

[54] FINE YELLOW COMPOSITE IRON OXIDE HYDROXIDE PIGMENT, AND PAINT OR RESIN COMPOSITION USING THE SAME

[75] Inventors: Kazuyuki Hayashi; Mineko Ohsugi, both of Hiroshima; Hiroshi Sumita, Okayama-ken; Hiroko Morii, Hiroshima, all of Japan

[73] Assignee: Toda Kogyo Corporation, Hiroshima-ken, Japan

[21] Appl. No.: 09/383,985

[22] Filed: Aug. 26, 1999

[30] Foreign Application Priority Data

Aug. 28, 1998 [JP] Japan .................. 10-243936

[51] Int. Cl.$^7$ .............. C09C 1/00; C09C 1/22; C09C 1/24; C09C 1/40
[52] U.S. Cl. .......... 106/456; 106/459; 428/403; 423/632; 423/633
[58] Field of Search ................ 106/456, 459; 428/403; 423/632, 633

[56] References Cited

U.S. PATENT DOCUMENTS

| | | | |
|---|---|---|---|
| 4,291,010 | 9/1981 | Senda et al. ............. | 423/594 |
| 4,376,656 | 3/1983 | Senda et al. ............. | 106/309 |
| 5,185,141 | 2/1993 | Krockert et al. ......... | 423/632 |
| 6,027,559 | 2/2000 | Morii et al. ............. | 106/456 |

FOREIGN PATENT DOCUMENTS

0704500A1  4/1996  European Pat. Off. .
0887387A2  12/1998  European Pat. Off. .

*Primary Examiner*—Mark L. Bell
*Assistant Examiner*—Michael J. DiVerdi
*Attorney, Agent, or Firm*—Nixon & Vanderhye

[57] ABSTRACT

A fine yellow composite iron oxide hydroxide pigment of the present invention has an average major axial diameter of not less than 0.005 μm and less than 0.1 μm, which comprises:

- fine goethite particles as core particles, containing aluminum inside thereof in an amount of 0.05 to 50% by weight, calculated as Al, based on the weight of said core particles; and
- a composite oxide hydroxide of Fe and Al, coated on the surface of each core particle. Such fine yellow composite iron oxide hydroxide pigment are excellent in transparency and heat resistance.

13 Claims, No Drawings

FINE YELLOW COMPOSITE IRON OXIDE HYDROXIDE PIGMENT, AND PAINT OR RESIN COMPOSITION USING THE SAME

BACKGROUND OF THE INVENTION

The present invention relates to a fine yellow composite iron oxide hydroxide pigment, and a paint or a resin composition using the pigment, and more particularly, to a fine yellow composite iron oxide hydroxide pigment which are excellent in transparency and heat resistance, a paint or a resin composition using the pigment, and a process for producing the pigment.

Iron oxide hydroxide particles have been widely known as a yellow pigment because these particles can exhibit a yellow color, and have been used in many applications such as coloring of paints, printing inks, films, plastics, films, building materials, cosmetics and the like.

Among the iron oxide hydroxide particles, by using those having a particle size of less than 0.1 μm, the formed coating film is transparent to visible light and, therefore, such particles are useful as a transparent yellow iron oxide hydroxide pigment.

The yellow iron oxide hydroxide pigment composed of iron oxide hydroxide fine particles having a particle size of less than 0.1 μm (hereinafter referred to merely as "fine yellow iron oxide pigment") are deteriorated in dispersibility in vehicles or resin composition due to the reduction of the particle size thereof. Therefore, a coating film or a resin composition using the fine yellow iron oxide hydroxide pigment is unsatisfactory in transparency, and is also deteriorated in heat resistance.

Namely, the fine yellow iron oxide hydroxide pigment has a high surface energy and tends to be agglomerated due to the reduction of the particle size thereof, so that it is difficult to disperse the pigment in vehicles. Therefore, a coating film formed from such an insufficient dispersion cannot show a sufficient transparency since the fine pigment is agglomerated into coarse particles.

Consequently, it has been strongly demanded to improve not only the dispersibility of the fine yellow iron oxide hydroxide pigment in vehicles or resins but also the transparency of the pigment itself.

Further, since the iron oxide hydroxide particles has a chemical composition: $Fe_2O_3 \cdot H_2O$ (=2FeOOH), i.e., contain crystallization water therein, the dehydration thereof is generally initiated at about 200° C. as the heating temperature is elevated. When the heating temperature is further elevated, the iron oxide hydroxide particles are transformed into reddish brown hematite ($\alpha$-$Fe_2O_3$) at about 230° C. Thus, the iron oxide hydroxide particles per se are deteriorated in heat resistance. Especially, in the case of fine iron oxide hydroxide particles, the dehydration-initiating temperature tends to be further decreased due to a large specific surface area thereof. For this reason, it is difficult to apply the fine yellow iron oxide hydroxide pigment to thermoplastic resins such as polyethylene, polypropylene, styrene polymers, polyamides, polyolefins or ABS resins which are usually molded at as high a temperature as not less than 200° C. Consequently, it has been strongly demanded to enhance the heat resistance of the fine yellow iron oxide hydroxide pigment.

Hitherto, in order to improve a weather resistance or a heat resistance of such a fine yellow iron oxide hydroxide pigment, there have been proposed and attempted various methods, e.g., a method of producing a transparent metal oxide comprising adding a surfactant to a sol composed of a hydrated metal oxide having an average particle size of not more than 300 Å, or agglomerating the sol by first adding aluminum ions and then the surfactant thereto (Japanese Patent Publication (KOKOKU) No. 6-2562(1994)); a method of forming a solid solution of AlOOH in each yellow iron oxide particle in order to enhance a heat resistance thereof (Japanese Patent Publication (KOKOKU) No. 55-8462(1980)); or the like.

In EP 0887387 A2, there have been proposed yellow iron oxide hydroxide particles comprising iron oxide hydroxide particle as Et core, composite oxide hydroxide of Fe and Al deposited on surface of the iron oxide hydroxide particle as a core, and optionally a hydroxide of aluminum covered on a surface of the composite oxide hydroxide, wherein the amount of Al in the composite oxide hydroxide is 0.1 to 10% by weight (calculated as Al) based on the weight of the iron oxide hydroxide particle as a core, the amount of Fe in the composite oxide hydroxide is 0.1 to 50% by weight (calculated as Fe) based on the weight of the iron oxide hydroxide particle as a core and the ratio of Al to Fe in the composite oxide hydroxide is 1:0.5 to 1:20 (0.05:1 to 2:1) (calculated as Al and Fe atoms); and having an average major axial diameter of 0.1 to 1.0 μm, an average minor axial diameter of 0.02 to 0.10 μm, an aspect ratio (major axial diameter/minor axial diameter) of 2:1 to 20:1, a BET specific surface area of 10 to 180 $m^2/g$ and a heat-resistance temperature of not less than 265° C.

At the present time, it has been most strongly demanded to provide a fine yellow iron oxide hydroxide pigment which are excellent in both transparency and heat resistance. However, such fine yellow iron oxide hydroxide pigment which can fulfill these properties cannot be obtained yet.

That is, the surfaces of metal oxide particles in the above-mentioned Japanese Patent Publication (KOKOKU) No. 6-2562(1994), are coated with aluminum oxide. However, as shown in Comparative Examples hereinafter, although such particles have been improved in transparency, the heat resistance thereof is still unsatisfactory.

The yellow iron oxide pigment described in Japanese Patent Publication (KOKOKU) No. 55-8462(1980) contains AlOOH in the form of a solid solution. Therefore, although such a pigment shows an excellent heat resistance, the transparency thereof is still unsatisfactory as also shown in Comparative Examples hereinafter.

Further, the yellow iron oxide hydroxide particles proposed in EP 0887387 A2, are composed of iron oxide hydroxide as a core particle, and have an average major axial diameter of 0.1 to 1.0 μm. However, as shown in Comparative Examples hereinafter, the transparency of these particles is still unsatisfactory.

As a result of the present inventors' earnest studies for solving the above-mentioned problems, it has been found that by adding an aluminum compound and a ferrous salt compound to a water suspension of fine goethite particles which contain aluminum inside thereof in an amount of 0.05 to 50% by weight (calculated as Al) and have an average major axial diameter of not less than 0.005 μm and less than 0.1 μm, while stirring; and then passing an oxygen-containing gas through the resultant dispersion to coat a composite oxide hydroxide of Fe and Al on the surfaces of the fine goethite particles containing aluminum inside thereof, the obtained composite iron oxide hydroxide particles are useful as a fine yellow pigment which are excellent in both transparency and heat resistance. The present invention has been attained on the basis of the finding.

SUMMARY OF THE INVENTION

It is an object of the present invention to provide a fine yellow composite iron oxide hydroxide pigment which are excellent in both transparency and heat resistance.

It is another object of the present invention to provide a paint or a resin composition which is excellent in both transparency and heat resistance.

To accomplish the aims, in a first aspect of the present invention, there is provided a fine yellow composite iron oxide hydroxide pigment having an average major axial diameter of not less than 0.005 μm and less than 0.1 μm, comprising:

fine goethite particles as core particles each containing aluminum inside thereof in an amount of 0.05 to 50% by weight (calculated as Al) based on the weight of the core particles; and a composite oxide hydroxide of Fe and Al, coated on the surface of each core particle.

In a second aspect of the present invention, there is provided a fine yellow composite iron oxide hydroxide pigment having an average major axial diameter of not less than 0.005 μm and less than 0.1 μm, comprising:

fine goethite particles as core particles each containing aluminum inside thereof in an amount of 0.05 to 50% by weight (calculated as Al) based on the weight of the core particles;

a composite oxide hydroxide of Fe and Al, coated on the surface of each core particle; and a hydroxide of aluminum covered on the surface of said composite oxide hydroxide, in an amount of 0.1 to 20% by weight (calculated as Al) based on the total weight of said pigment.

In a third aspect of the present invention, there is provided a process for producing a fine yellow composite iron oxide hydroxide pigment, comprising:

(i) adding an aluminum compound and a ferrous salt compound to a water suspension containing fine goethite particles containing aluminum inside thereof in an amount of 0.05 to 50% by weight (calculated as Al) based on the weight of the core particles, and having an average major axial diameter of not less than 0.005 μm and less than 0.1 μm, while stirring; and (ii) passing an oxygen-containing gas through the resultant dispersion to coat a composite oxide hydroxide of Fe and Al on surfaces of said fine goethite particles.

In a fourth aspect of the present invention, there is provided a paint comprising a paint base material, and a fine yellow composite iron oxide hydroxide pigment having an average major axial diameter of not less than 0.005 μm and less than 0.1 μm, comprising:

fine goethite particles as core particles, containing aluminum inside thereof in an amount of 0.05 to 50% by weight (calculated as Al) based on the weight of the core particles; and a composite oxide hydroxide of Fe and Al, coated on the surface of each core particle.

In a fifth aspect of the present invention, there is provided a paint comprising a paint base material, and a fine yellow composite iron oxide hydroxide pigment having an average major axial diameter of not less than 0.005 μm and less than 0.1 μm, comprising:

fine goethite particles as core particles each containing aluminum inside thereof in an amount of 0.05 to 50% by weight (calculated as Al) based on the weight of the core particles;

a composite oxide hydroxide of Fe and Al, coated on the surface of each core particle; and a hydroxide of aluminum covered on the surface of said composite oxide hydroxide, in an amount of 0.1 to 20% by weight (calculated as Al) based on the total weight of said pigment.

In a sixth aspect of the present invention, there is provided rubber or resin composition comprising a rubber or resin base material, and a fine yellow composite iron oxide hydroxide pigment having an average major axial diameter of not less than 0.005 μm and less than 0.1 μm, comprising:

fine goethite particles as core particles, containing aluminum inside thereof in an amount of 0.05 to 50% by weight (calculated as Al) based on the weight of the core particles; and a composite oxide hydroxide of Fe and Al, coated on the surface of each core particle.

In a seventh aspect of the present invention, there is provided a rubber or resin composition comprising a rubber or resin base material, and a fine yellow composite iron oxide hydroxide pigment having an average major axial diameter of not less than 0.005 μm and less than 0.1 μm, comprising:

fine goethite particles as core particles each containing aluminum inside thereof in an amount of 0.05 to 50% by weight (calculated as Al) based on the weight of the core particles;

a composite oxide hydroxide of Fe and Al, coated on the surface of each core particle; and a hydroxide of aluminum covered on the surface of said composite oxide hydroxide, in an amount of 0.1 to 20% by weight (calculated as Al) based on the total weight of said pigment.

In an eighth aspect of the present invention, there are provided composite iron oxide hydroxide particles having an average major axial diameter of not less than 0.005 μm and less than 0.1 μm, comprising:

fine goethite particles as core particles containing aluminum inside thereof in an amount of 0.05 to 50% by weight (calculated as Al) based on the weight of the core particles; and a comprising composite oxide hydroxide of Fe and Al being deposited on the surface of each core particle.

DETAILED DESCRIPTION OF THE INVENTION

The present invention will now be described in detail below.

First, the fine yellow composite iron oxide hydroxide pigment according to the present invention is explained.

The fine yellow composite iron oxide hydroxide pigment according to the present invention, comprises fine goethite particles which contain aluminum inside thereof in an amount of 0.05 to 50% by weight (calculated as Al) based on the weight of the fine goethite particles containing aluminum inside thereof as core particles, and a composite oxide hydroxide of Fe and Al, formed on the surfaces thereof. The fine goethite particles have an average major axial diameter of not less than 0.005 and less than 0.1 μm, and may have an acicular shape, wherein the aspect ratio thereof is more preferably not less than 2:1, including spindle, rice ball, acicular or the like.

It is preferred that the aluminum contained inside of each fine goethite particle (as core particle), be substantially homogeneously distributed from a central portion to a surface of each fine goethite particle.

When the amount of aluminum contained inside of each fine goethite particle (core particle) is less than 0.05% by weight (calculated as Al) based on the weight of the fine goethite particle, it is difficult to obtain a fine yellow composite iron oxide hydroxide pigment having a sufficient transparency and a sufficient heat resistance. On the other hand, when the amount of aluminum contained is more than 50% by weight, the obtained fine yellow composite iron oxide hydroxide pigment can show a sufficient transparency and a sufficient heat resistance. However, the aimed effects of the present invention are already saturated and, therefore, the use of such a large amount of aluminum is unnecessary. In the consideration of the transparency and the heat resistance of the obtained fine yellow composite iron oxide hydroxide pigment, the amount of aluminum contained inside of each fine goethite particle (core particle) is preferably 0.1 to 40% by weight, more preferably 0.2 to 30% by weight (calculated as Al) based on the weight of the fine goethite particle.

The amount of aluminum contained in the composite oxide hydroxide of Fe and Al which is coated on the surface of each fine goethite particle, is preferably 0.1 to 10% by weight (calculated as Al) based on the weight of the fine goethite particle containing aluminum inside thereof. Also, the amount of iron contained in the composite oxide hydroxide deposited, is preferably 0.1 to 30% by weight (calculated as Fe) based on the weight of the fine goethite particle containing aluminum inside thereof. When the amounts of aluminum and iron contained in the composite oxide hydroxide deposited are less than the above-specified lower limits, the aimed effects of the present invention, i.e., the effects for enhancing the transparency and heat resistance, may not be obtained. On the other hand, when the amounts of aluminum and iron contained in the composite oxide hydroxide deposited are more than the above-specified upper limits, the aimed effects for enhancing the transparency and heat resistance are already saturated and, therefore, the use of such large amounts of aluminum and iron is unnecessary. In the consideration of the transparency and the heat resistance of the obtained fine yellow composite iron oxide hydroxide pigment, the content of aluminum in the composite oxide hydroxide deposited is more preferably 0.5 to 10% by weight (calculated as Al) based on the weight of the fine goethite particle containing aluminum inside thereof, and the content of iron in the composite oxide hydroxide deposited is more preferably 0.1 to 20% by weight (calculated as Fe) based on the weight of the fine goethite particle containing aluminum inside thereof.

The fine yellow composite iron oxide hydroxide pigment according to the present invention, may have the substantially same average major axial diameter as that of the fine goethite particles containing aluminum inside thereof, i.e., not less than 0.005 $\mu$m and less than 0.1 $\mu$m. In general, when the particle size is less than 0.1 $\mu$m, since an intermolecular force between the particles is increased, it may become difficult to uniformly disperse the pigment in vehicles or resins. As a result, the gloss of a coating film or a resin composition obtained by using the pigment tends to be deteriorated. However, contrary to such an expectation, the fine yellow composite iron oxide hydroxide pigment according to the present invention, can show a gloss as high as, for example, not less than 80°.

When the average major axial diameter of the fine yellow composite iron oxide hydroxide pigment is less than 0.005 $\mu$m, since an intermolecular force between the particles is increased, it may become difficult to uniformly disperse the pigment in vehicles or resins. As a result, a coating film or a resin composition obtained by using the pigment may fail to show a sufficient transparency. On the other hand, when the average major axial diameter thereof is not less than 0.1 $\mu$m, although the dispersibility in vehicles or resins is good, the pigment particles are too coarse, so that a tinting strength of the pigment is considerably increased. As a result, the coating film or the resin composition obtained by using the pigment no longer shows a sufficient transparency.

In the consideration of the dispersibility in vehicles or resins and the transparency of the obtained coating film or resin composition, the average major axial diameter of the fine yellow composite iron oxide hydroxide pigment according to the present invention, is preferably 0.01 to 0.09 $\mu$m, more preferably 0.01 to 0.08 $\mu$m.

The fine yellow composite iron oxide hydroxide pigment according to the present invention, further has an average minor axial diameter of preferably not less than 0.0025 $\mu$m and less than 0.05 $\mu$m, more preferably 0.005 to 0.045 $\mu$m, still more preferably 0.005 to 0.04 $\mu$m; an aspect ratio (major axial diameter/minor axial diameter) of preferably not more than 20:1, more preferably not more than 15:1, still more preferably 2:1 to 10:1; a BET specific surface area of preferably 50 to 300 m$^2$/g, more preferably 70 to 280 m$^2$/g, still more preferably 80 to 250 m$^2$/g; and a geometrical standard deviation of average major axial diameter of preferably not more than 1.8, more preferably not more than 1.7. The preferable lower limit of the geometrical standard deviation of average major axial diameter is 1.01.

When the average minor axial diameter of the fine yellow composite iron oxide hydroxide pigment is less than 0.0025 $\mu$m, since an intermolecular force between the particles is increased, it becomes difficult to uniformly disperse the pigment in vehicles or resins. On the other hand, when the average minor axial diameter thereof is not less than 0.05 $\mu$m, it may be difficult to produce fine acicular-shaped goethite particles as core particles.

When the BET specific surface area of the fine yellow composite iron oxide hydroxide pigment is less than 50 m$^2$/g, the pigment particles are too coarse, so that a tinting strength of the pigment is considerably increased. As a result, the coating film or the resin composition obtained by using the pigment no longer shows a sufficient transparency. On the other hand, when the BET specific surface area thereof is more than 300 m$^2$/g, since an intermolecular force between the particles is increased, it becomes difficult to uniformly disperse the pigment in vehicles or resins.

When the geometrical standard deviation of the fine yellow composite iron oxide hydroxide pigment is more than 1.80, it becomes difficult to uniformly disperse the pigment in vehicles or resins. Under the consideration of the industrial productivity, the lower limit of the geometrical standard deviation value is 1.01.

When the aspect ratio, the BET specific surface area of the fine yellow composite iron oxide hydroxide pigment is more than 20:1, the particles are frequently entangled or intertwined with each other, so that the dispersibility of these particles in vehicles or resins tends to be deteriorated. And the viscosity in vehicles tends to be increased.

The fine yellow composite iron oxide hydroxide pigment according to the present invention, has a heat-resisting temperature of usually not less than 260° C., preferably not less than 263° C., more preferably not less than 266° C.

The surface of the fine yellow composite iron oxide hydroxide pigment according to the present invention, may be covered with a hydroxide of aluminum, if necessary. Such a fine yellow composite iron oxide hydroxide pigment whose surface is covered with a hydroxide of aluminum, can show a further enhanced heat resistance, because the hydroxide of aluminum itself is excellent in heat resistance.

The covering amount of the hydroxide of aluminum is preferably 0.01 to 20% by weight (calculated as Al) based on the total weight of the pigment. When the covering amount of the hydroxide of aluminum is less than 0.01% by weight, almost no effect for enhancing the heat resistance caused by the cover of the hydroxide of aluminum can be obtained. On the other hand, when the covering amount of the hydroxide of aluminum is more than 20% by weight, the coating effect is already saturated and, therefore, the use of such a large amount is unnecessary. In the consideration of the heat resistance and the productivity, the covering amount of the hydroxide of aluminum is more preferably 0.05 to 15% by weight (calculated as Al) based on the total weight of the pigment.

The fine yellow composite iron oxide hydroxide pigment coated with the composite oxide hydroxide of Al and Fe according to the present invention, which is covered with the hydroxide of aluminum on the surface of the composite oxide hydroxide, has the substantially same properties, i.e., the average major axial diameter, average minor axial diameter, aspect ratio, BET specific surface area and geometrical standard deviation, as those of the fine yellow composite iron oxide hydroxide pigment coated with the composite oxide. The fine yellow composite iron oxide hydroxide pigment which is coated with the composite oxide hydroxide of Al and Fe on the surface of the fine goethite particles as core particles, and covered with the hydroxide of aluminum on the composite oxide hydroxide according to the present invention, can show a still enhanced heat-resisting temperature as high as usually not less than 255° C., preferably 265° C. When the fine yellow composite iron oxide hydroxide pigment according to the present invention is used as a paint raw material, the gloss of the coating film is usually not less than 80%, preferably not less than 85% and, therefore, is excellent in dispersibility. In addition, the linear absorption of the coating film obtained using the fine yellow composite iron oxide hydroxide pigment according to the present invention, is usually not more than 0.030 $\mu m^{-1}$, preferably not more than 0.025 $\mu m^{-1}$ and, therefore, is excellent in transparency.

Next, the process for producing the fine yellow composite iron oxide hydroxide pigment according to the present invention is described.

The fine goethite particles containing aluminum inside thereof used in the present invention may be produced as follows. That is, when the fine goethite particles are produced by passing an oxygen-containing gas such as air through a suspension containing an iron-containing precipitate such as hydroxide of iron or iron carbonate which is obtained by reacting an aqueous ferrous salt solution with an aqueous alkali hydroxide solution and/or an aqueous alkali carbonate solution, an aluminum compound is allowed to exist in the reaction system in advance of passing the oxygen-containing gas such as air through the suspension, so that it becomes possible to obtain fine goethite particles containing aluminum inside thereof in a substantially homogeneous state.

As to the addition of the aluminum compound, it is important to allow the aluminum compound to be present in the reaction system before passing the oxygen-containing gas such as air though the suspension. More specifically, the aluminum compound may be added to either the aqueous ferrous salt solution, the aqueous alkali hydroxide solution, the aqueous alkali carbonate solution, the aqueous alkali hydroxide-alkali carbonate solution or the water suspension containing the iron-containing precipitate. Among them, it is preferred that the aluminum compound be added to the aqueous ferrous salt solution.

As the aluminum compounds added, there may be exemplified alkali aluminates such as sodium aluminate; aluminum salts such as aluminum sulfate, aluminum chloride, aluminum acetate or aluminum nitrate, or the like. The amount of the aluminum compound added is preferably 0.5 to 350 mol % (calculated as Al) based on Fe contained in the aqueous ferrous salt solution. When the amount of the aluminum compound added is less than 0.5 mol %, the aimed effects of the present invention, i.e., the effects of enhancing the transparency and the heat resistance may not be obtained. On the other hand, when the amount of the aluminum compound added is more than 350 mol %, the aimed effects of the present invention are already almost saturated and, therefore, the use of such a large amount of the aluminum compound is unnecessary.

The coating treatment of the composite oxide hydroxide of Fe and Al on the surfaces of the fine goethite particles containing aluminum inside thereof may be carried out by adding an aluminum compound and an aqueous ferrous salt solution to a water suspension of the fine goethite particles containing aluminum inside thereof, while stirring, and then passing an oxygen-containing gas through the resultant water suspension. In the consideration of the production of the composite oxide hydroxide of Fe and Al, it is preferred that the oxygen-containing gas is passed through the water suspension while maintaining the pH value of the water suspension at not more than 5 or not less than 10. The concentration of the fine aluminum-containing goethite particles in the water suspension may be adjusted to usually about 5 to about 150 g/liter. In the consideration of the productivity, the concentration of the fine aluminum-containing goethite particles in the water suspension is preferably about 10 to about 120 g/liter, more preferably about 20 to about 100 g/liter.

As the aluminum compounds added for forming the coat of the composite oxide hydroxide of Fe and Al, there may be used the same compounds as described hereinabove for the production of the fine goethite particles containing aluminum inside thereof. The amount of the aluminum compound added is usually 0.1 to 10% by weight (calculated as Al) based on the weight of the fine goethite particles containing aluminum inside thereof. When the amount of the aluminum compound added is less than 0.1% by weight, the aimed effects of the present invention, i.e., the effects of improving the dispersibility or enhancing the heat resistance may not be obtained. On the other hand, when the amount of the aluminum compound added is more than 10% by weight, the effects by the addition of the aluminum compound are already saturated and, therefore, the use of such a large amount is unnecessary. Almost whole amount of aluminum contained in the aluminum compound added can be coated on the surfaces of the fine goethite particles containing aluminum inside thereof.

As the aqueous ferrous salt solutions added, there may be exemplified aqueous solutions of ferrous salts such as ferrous sulfate, ferrous chloride, ferrous nitrate or the like. The amount of the ferrous salt added is 0.1 to 30% by weight (calculated as Fe) based on the weight of the fine goethite particles containing aluminum inside thereof. When the amount of the ferrous salt added is less than 0.1% by weight, the aimed effects of the present invention, i.e., the effects of improving the dispersibility and enhancing the heat resistance cannot be obtained. On the other hand, when the amount of the ferrous salt added is more than 30% by weight, the aimed effects of the present invention are already saturated and, therefore, the addition of such a large amount of the ferrous salt is unnecessary. Also, almost whole amount of iron contained in the ferrous salt added can be coated as the composite oxide hydroxide on the surfaces of the fine goethite particles containing aluminum inside thereof.

The ratio of the aluminum compound to the aqueous ferrous salt solution added is preferably 1:0.5 to 1:20, more preferably 1:1 to 1:10 (calculated as an atomic ratio Al/Fe) in the consideration of the aimed effects of the present invention, i.e., the effects of improving the dispersibility and enhancing the heat resistance.

Substantially whole amounts of aluminum and iron contained in the aluminum compound and the aqueous ferrous salt solution added, respectively, are coated in the form of composite oxide hydroxide of Fe and Al, on surfaces of the fine goethite particles containing aluminum inside thereof. Therefore, the ratio of Fe to Al in the composite oxide hydroxide of Fe and Al is substantially the same as that upon the addition of the aluminum compound and the aqueous ferrous salt solution.

The order of addition of the aluminum compound and the aqueous ferrous salt solution is optional. Accordingly, any of the aluminum compound and the aqueous ferrous salt solution may be added first, or both thereof may be added simultaneously.

As the oxidation method, there may be used a method of passing an oxygen-containing gas (e.g., air) through the suspension while stirring by the gas passed through the suspension or by mechanical operations, or the like.

In accordance with the present invention, the fine yellow composite iron oxide hydroxide pigment coated with the composite oxide hydroxide of Fe and Al on the surface thereof, may be further covered with a hydroxide of aluminum, if required.

The covering treatment of the hydroxide of aluminum may be carried out by ordinary methods, i.e., by adjusting the pH value of the water suspension containing the yellow composite iron oxide hydroxide particles coated with the composite oxide hydroxide of Fe and Al is deposited, to not more than 4 or not less than 10; adding an aluminum compound to the water suspension, while stirring; readjusting the pH value of the water suspension to 5 to 9, thereby covering the surface of the composite oxide hydroxide of Fe and Al with the hydroxide of aluminum; filtering out the particles from the water suspension; and then subjecting the obtained particles to washing with water and then drying.

The pH value of the water suspension may be adjusted by adding an ordinarily used aqueous alkaline solution or aqueous acid solution thereto.

As the aluminum compounds added for covering with the hydroxide of aluminum, there may be used the same aluminum compounds as described hereinabove.

Substantially whole amount of aluminum contained in the aluminum compound added, may be applied in the form of the hydroxide of aluminum, onto the surface of the composite oxide hydroxide of Fe and Al.

Next, the paint using the fine yellow composite iron oxide hydroxide pigment according to the present invention, will now be described in detail.

The paint using the fine yellow composite iron oxide hydroxide pigment according to the present invention, has a gloss of usually not less than 80%, preferably not less than 85% when formed into a coating film. The coating film thus produced from the paint according to the present invention, has a heat-resisting temperature of usually not less than 255° C. As to the transparency of the coating film, the linear absorption thereof is usually not more than 0.03 $\mu m^{-1}$, preferably not more than 0.025 $\mu m^{-1}$.

As to the blending ratio of the fine yellow composite iron oxide hydroxide pigment according to the present invention to a paint base material, the fine yellow composite iron oxide hydroxide pigment may be used in an amount of 0.5 to 100 parts by weight based on 100 parts by weight of the paint base material. In the consideration of handling property of the paint, the amount of the fine yellow composite iron oxide hydroxide pigment used is preferably 1.0 to 80 parts by weight, more preferably 1.0 to 50 parts by weight based on 100 parts by weight of the paint base material.

The paint base material is composed of a resin and a solvent, and may further contain, if required, a defoamer, an extender pigment, a drying agent, a surfactant, a hardner, an auxiliary agent and the like.

Examples of the resins may include those ordinarily used for solvent-based paints such as acrylic resins, alkyd resins, polyester resins, polyurethane resins, epoxy resins, phenol resins, melamine resins, amino resins or the like; or those ordinarily used for water-based paints such as water-soluble alkyd resins, water-soluble melamine resins, water-soluble acrylic resins, water-soluble urethane emulsion resins or the like.

Examples of the solvents may include those ordinarily used for solvent-based paints such as toluene, xylene, butyl acetate, methyl acetate, methyl isobutyl ketone, butyl cellosolve, ethyl cellosolve, butyl alcohol, aliphatic hydrocarbons or the like; or those ordinarily used for water-based paints such as water, butyl cellosolve, butyl alcohol or the like.

As the defoamer, there may be used commercially available products such as NOPCO 8034 (tradename), SN-DEFOAMER 477 (tradename), SN-DEFOAMER 5013 (tradename), SN-DEFOAMER 382 (tradename) or SN-DEFOAMER 247 (tradename) (produced by San Nopco Co., Ltd.); ANTIFOAM 08 (tradename) or EMULGEN 903 (tradename) (produced by Kao Co., Ltd.); or the like.

Next, the resin composition using the fine yellow composite iron oxide hydroxide pigment according to the present invention, is described.

The resin composition using the fine yellow composite iron oxide hydroxide pigment according to the present invention, has a heat-resisting temperature of usually not less than 210° C. As to the transparency of the resin composition, the linear absorption thereof is usually 0.05 $\mu m^{-1}$. In addition, the resin composition has a dispersing condition of usually not less than 3, preferably not less than 4, more preferably 5 when evaluated by such a method as defined in Examples hereinafter.

The amount of the fine yellow composite iron oxide hydroxide pigment blended in the resin composition according to the present invention is usually 0.01 to 50 parts by weight based on 100 parts by weight of resins. In the consideration of handling property of the resin composition, the amount of the fine yellow composite iron oxide hydroxide pigment used is preferably 0.05 to 45 parts by weight, more preferably 0.1 to 40 parts by weight based on 100 parts by weight of resins.

As the resins used in the resin composition, there may be exemplified natural rubbers, synthetic rubbers, thermoplastic resins such as polyvinyl chloride, polyolefins such as polyethylene, polypropylene, polybutene, poluisobutylene or the like, styrene polymers, polyamides, or the like. The resin composition may contain, if required, additives such as a lubricant, a plasticizer, an anti-oxidizing agent, an ultraviolet light absorber or various other stabilizers.

The additives may be added in an amount of not more than 50% by weight based on the total weight of the fine yellow composite iron oxide hydroxide pigment and the resins. When the amount of the additives added is more than 50% by weight, the resin composition is deteriorated in moldability.

The resin composition according to the present invention may be obtained by intimately mixing a resin and the fine yellow composite iron oxide hydroxide pigment together in advance and then applying a strong shear force to the obtained mixture by a kneader or an extruder in order to crush aggregates of the fine yellow composite iron oxide hydroxide pigment and uniformly disperse the fine yellow composite iron oxide hydroxide pigment in the resin. The thus obtained resin composition may be formed into an appropriate shape upon use according to the applications thereof.

The important feature of the present invention lies in such a fact that the fine yellow composite iron oxide hydroxide pigment composed of fine goethite particles containing aluminum inside thereof in an amount of 0.05 to 50% by weight (calculated as Al), which particles are coated with the composite oxide hydroxide of Fe and Al, are excellent in both transparency and heat resistance.

The reason why the fine yellow composite iron oxide hydroxide pigment according to the present invention can show an excellent transparency, is considered as follows. That is, since an oxide hydroxide of aluminum which is one of extender pigments having a low refractive index and exhibiting a transparency when kneaded with oil or varnish and, therefore, a low hiding power against a surface to be coated, is contained within each fine goethite particle, the fine goethite particles themselves show a high transparency. Further, since the surfaces of the fine goethite particles are coated with the composite oxide hydroxide of Fe and Al as an outer layer, the fine yellow composite iron oxide hydroxide pigment can show an enhanced dispersibility in vehicles or resin compositions. As a result, it is considered that the paint or resin composition using such a pigment can show a further enhanced transparency.

The reason why the fine yellow composite iron oxide hydroxide pigment according to the present invention can show an improved dispersibility, may be considered as follows. That is, due to the facts that when forming a coating film using the fine yellow composite iron oxide hydroxide pigment, the gloss of the coating film is increased and when incorporated into the paint base material, the viscosity of the paint obtained by using the fine yellow composite iron oxide hydroxide pigment is reduced, it may be considered that the fine yellow composite iron oxide hydroxide pigment has a good compatibility with vehicles, since the outer layer is composed of an aluminum-containing compound.

The reason why the fine yellow composite iron oxide hydroxide pigment according to the present invention can show an enhanced heat resistance, is considered as follows. That is, the fine goethite particles contain aluminum inside thereof. In addition, the composite oxide hydroxide of Fe and Al which is coated on the surface of each fine goethite particle, tends to form a dense layer. Further, the composite oxide hydroxide contains Fe and, therefore, tends to be closely adhered on the surface of each fine goethite particle also containing Fe.

The reason why the fine yellow composite iron oxide hydroxide pigment according to the present invention can show a more excellent heat resistance when further optionally covered with the hydroxide of aluminum, is considered as follows. That is, the hydroxide of aluminum per se can show an excellent heat resistance, and since the composite oxide hydroxide as an undercoat contains aluminum, the hydroxide of aluminum as an upper layer can be strongly bonded to the composite oxide hydroxide undercoat. Incidentally, the transparency of the pigment covered with the hydroxide of aluminum is substantially identical to that uncovered with the hydroxide of aluminum. Accordingly, the transparency of the fine goethite particles which contain aluminum inside thereof and on the surfaces of which the composite oxide hydroxide of Fe and Al is coated, is not adversely affected by the cover with the hydroxide of aluminum.

The fine yellow composite iron oxide hydroxide pigment according to the present invention are excellent in both transparency and heat resistance, as shown in Examples hereinafter. Therefore, the fine yellow composite iron oxide hydroxide pigment according to the present invention is suitable as a fine yellow-color pigment.

Further, the paint or resin composition using the fine yellow composite iron oxide hydroxide pigment according to the present invention can also show an excellent transparency and an excellent heat resistance because the fine yellow composite iron oxide hydroxide pigment itself are excellent in transparency and heat resistance.

EXAMPLES

The present invention is described in more detail by Examples and Comparative Examples, but the Examples are only illustrative and, therefore, not intended to limit the scope of the present invention.

Various properties were evaluated by the following methods.

(1) The average major axial diameter and average minor axial diameter of pigment particles are respectively expressed by the average values obtained by measuring major axial diameters and minor axial diameters of about 350 particles which were sampled from a micrograph obtained by magnifying an electron micrograph (×30,000) four times in each of the longitudinal and transverse directions.

(2) The aspect ratio of particles is obtained by calculating a ratio of the average major axial diameter to the average minor axial diameter thereof.

(3) The geometrical standard deviation of major axial diameters of pigment particles is expressed by the value obtained by the following method. That is, the major axial diameters were measured from the above magnified electron micrograph. The actual major axial diameters and the number of the particles were calculated from the measured values. On a logarithmic normal probability paper, the major axial diameters were plotted at regular intervals on the abscissa-axis and the accumulative number (under integration sieve) of particles belonging to each interval of the major axial diameters were plotted by percentage on the ordinate-axis by a statistical technique.

The major axial diameters corresponding to the number of particles of 50% and 84.13%, respectively, were read from the graph, and the geometrical standard deviation was calculated from the following formula:

Geometrical standard deviation={major axial diameter corresponding to 84.13% under integration sieve}/{major axial diameter (geometrical average diameter) corresponding to 50% under integration sieve)}

The closer to 1 the geometrical standard deviation value, the more excellent the particle size distribution.

(4) The specific surface area is expressed by the value measured by a BET method.

(5) The amount of Al contained within fine goethite particles, the amount of Al contained in composite oxide hydroxide of Fe and Al which was coated on the surface of each fine goethite particle, and the amount of Al contained in a hydroxide of aluminum covered on the surface of the composite oxide hydroxide, were measured by a fluorescent X-ray spectroscopy device "3063M Model" (manufactured by Rigaku Denki Kogyo Co., Ltd.) according to JIS K0119 "General rule of fluorescent X-ray analysis".

(6) The atomic ratio Al/Fe in composite oxide hydroxide of Fe and Al which was coated on the surfaces of fine goethite particles, is expressed by the value obtained by the following method. That is, 0.25 g of the yellow composite iron oxide hydroxide pigment was weighed and charged into a 100 ml conical flask, and then mixed with 33.3 ml of ion exchange water. The flask was placed in a water bath heated to 60° C., and the content therein was stirred for 20 minutes by a magnetic stirrer, thereby obtaining a suspension.

Next, the obtained suspension was mixed with 16.7 ml of a 12N-hydrochloric acid solution and further stirred for 20 minutes. As a result, a portion of the composite oxide hydroxide of Fe and Al coated on the surface of each fine aluminum-containing goethite particle which portion extends from an outer surface of the composite oxide hydroxide up to approximately a mid point of the distance between the outer surface of the composite oxide hydroxide and an outer surface of each fine goethite particle, and has a substantially uniform composition, was dissolved out with the acid from the outer surface thereof toward the inside of the particle (This was already confirmed by many experiments). Thereafter, the suspension containing components dissolved-out by the acid, was subjected to suction filtration using a 0.1 μm-membrane filter. The amounts (ppm) of Al and Fe in the obtained filtrate were measured by an inductively-coupled plasma atomic emission spectrometer (SPS-4000 manufactured by Seiko Denshi Kogyo Co., Ltd.).

Further, the amount of Fe in the composite oxide hydroxide of Fe and Al was calculated from the weight ratio of Al to Fe obtained from the measured amounts of Al and Fe in the filtrate and the amount (% by weight) of Al in the composite oxide hydroxide obtained by the above-mentioned fluorescent X-ray analysis, according to the following formula.

Amount of Fe (% by weight)=Amount of Al (% by weight)/Weight ratio of Al to Fe (7) The heat resistance of fine yellow composite iron oxide hydroxide pigment is expressed by the temperature read out from a DSC chart obtained by subjecting a test sample to differential scanning calorimetry (DSC) using a thermal analyzing apparatus SSC-5000 (manufactured by Seiko Denshi Kogyo Co., Ltd.), which temperature was read at a crossing point of two tangential lines on two curves constituting the first one of two inflection points which form a peak on the DSC chart.

(8) The transparency of a coating film or a resin composition using the fine yellow composite iron oxide hydroxide pigment, is expressed by a linear absorption calculated from a light transmittance of a coating film obtained by coating a 100 μm-thick clear base film with a paint prepared by the method described hereinafter, or a light transmittance of a resin plate having the below-mentioned composition, according to the following formula. The respective light transmittances were measured by a self-recording photoelectric spectrophotometer "UV-2100" (manufactured by Simazu Seisakusho Co., Ltd.)

Linear absorption $(\mu m^{-1})=\ln(1/t)/FT$ wherein t represents a light transmittance (–) at $\lambda=900$ nm.

The smaller the linear absorption, the higher the light transmittance, i.e., the higher the transparency.

(9) The heat resistance of a coating film is determined as follows. That is, a paint prepared by the below-mentioned method was applied onto a transparent glass plate (having a size of 0.8 mm (thickness)×70 mm (width)×150 mm (length)). The coated glass plate was placed in an electric furnace, and while varying the temperature of the electric furnace, heat-treated for 15 minutes at each temperature. The hues (L* value, a* value and b* value) of the coated glass plate on a standard white back plate before and after heat treatment at each temperature were respectively measured by a portable spectrocolorimeter "COLOR-GUIDE 45/0" (manufactured by BYK Chemie Japan Co., Ltd.) according to JIS Z 8729. Based on the measured values before the heat treatment, ΔE* was calculated according to the below-mentioned formula. The temperature at which the ΔE* value was identical to just 1.5, was determined as the heat-resisting temperature of the coating film.

(10) The heat resistance of a resin composition was determined as follow. That is, a resin plate cut into 5 cm square, was placed in a hot press, and while varying the temperature of the hot press and applying a load of 1 ton/cm² thereto, heat-treated for 10 minutes at each temperature. The hues (L* value, a* value and b* value) of the resin plate before and after heat treatment at each temperature were respectively measured. Based on the measured values before the heat treatment, ΔE* was calculated according to the below-mentioned formula. The temperature at which the ΔE* value was identical to just 1.5, was determined as the heat-resisting temperature of the resin composition.

$$\Delta E^*=\{(\Delta L^*)^2+(\Delta a^*)^2+(\Delta b^*)^2\}^{1/2}$$

wherein:

ΔL*: Difference in L* value of the test sample before and after the heat treatment;

Δa*: Difference in a* value of the test sample before and after the heat treatment; and Δb*: Difference in b* value of the test sample before and after the heat treatment.

(11) The dispersibility in vehicle was determined by measuring the gloss on a coating surface of a coating film obtained by using a paint prepared by the below-mentioned method.

More specifically, the gloss was obtained by measuring the 20° gloss using a glossmeter UGV-5D (manufactured by Suga Shikenki Co., Ltd.). The higher the gloss, the more excellent the dispersibility of the fine yellow composite iron oxide hydroxide pigment particles in vehicle.

(12) The paint viscosity is expressed by the value obtained by measuring the viscosity (at 25° C.) of a paint prepared by the below-mentioned method, at a shear rate (D) of 1.92 sec⁻¹ using an E-type viscometer (cone plate-type viscometer) EMD-R (manufactured by Tokyo Keiki Co., Ltd.).

(13) The dispersibility in resin composition was evaluated by visually counting the number of undispersed aggregate particles on a surface of the obtained resin composition, and classifying the results into the following five ranks. The 5th rank represents the most excellent dispersing condition.

Rank 5: No undispersed aggregate particles were recognized;

Rank 4: 1 to 4 undispersed aggregate particles per 1 $cm^2$ were recognized;

Rank 3: 5 to 9 undispersed aggregate particles per 1 $cm^2$ were recognized;

Rank 2: 10 to 49 undispersed aggregate particles per 1 $cm^2$ were recognized; and Rank 1: not less than 50 undispersed aggregate particles per 1 $cm^2$ were recognized.

Example 1

<Production of fine yellow composite iron oxide hydroxide pigment>

A slurry of aluminum-containing acicular goethite fine particles (average major axial diameter: 0.0710 μm, average minor axial diameter: 0.0108 μm, aspect ratio: 6.6:1, BET specific surface area: 180.5 $m^2$/g, Al content: 0.83% by weight, geometrical standard deviation: 1.33, heat resistance: 245° C.) which was obtained by using an aqueous ferrous sulfate solution, an aqueous aluminum sulfate solution and an aqueous sodium carbonate solution, was subjected to filtration using a filter press, and then the obtained filter cake was sufficiently washed with water while passing water therethrough.

The obtained wet cake was taken out of the filter press and deaggregated again in water by a stirrer, thereby adjusting the concentration of the fine aluminum-containing goethite particles in the suspension to 45 g/liter. 20 liters of the obtained suspension having a pH value of 6.5 was mixed with 667 ml of a 0.5 mol/liter-aluminum acetate aqueous solution (equivalent to 1.0% by weight (calculated as Al) based on the weight of the fine aluminum-containing goethite particles) and 476 ml of a 1.4 mol/liter-ferrous sulfate aqueous solution (atomic ratio Al/Fe when added: ½). The obtained suspension was heated to 80° C. while blowing air thereinto at a feed rate of 65 liter per minute, and then allowed to stand at that temperature for 3 hours while maintaining the pH value thereof at 4.3, thereby coating composite oxide hydroxide of Fe and Al on the surfaces of the fine aluminum-containing goethite particles.

Successively, the suspension was subjected to filtration using a press filter, and then the resultant filter cake was sufficiently washed with water while passing water therethrough, thereby obtaining a wet cake. A part of the thus obtained wet cake was dried at 120° C. for 24 hours, and then pulverized by a free crusher (M-2 model, manufactured by Nara Kikai Seisakusho Co., Ltd.), thereby obtaining fine yellow composite iron oxide hydroxide pigment. The obtained fine yellow composite iron oxide hydroxide pigment had an average major axial diameter of 0.0712 μm, an average minor axial diameter of 0.0111 μm, an aspect ratio of 6.4:1, a BET specific surface area of 171.4 $m^2$/g and a heat resistance of 276° C. Further, the amount of the composite oxide hydroxide deposited was 0.98% by weight (calculated as Al) and 4.05% by weight (calculated as Fe) based on the weight of the fine aluminum-containing goethite particles.

Example 2

<Production of paint using fine yellow composite iron oxide hydroxide pigment>

5 g of the fine yellow composite iron oxide hydroxide pigment obtained in Example 1, was charged together with other paint components shown below into a 250 ml glass bottle. These components were intimately mixed and dispersed together with 160 g of 3 mmφ glass beads by a paint shaker for 120 minutes, thereby preparing a mill base.

| Composition of mill base: | |
|---|---|
| Fine yellow composite iron oxide hydroxide pigment | 9.9 parts by weight |
| Melamine resin (SUPER-PECKAMINE J-820-60 (tradename) produced by Dai-Nippon Ink Kagaku Kogyo Co., Ltd.) | 19.8 parts by weight |
| Alkyd resin (BEKKOSOL 1307-60EL (tradename) produced by Dai-Nippon Ink Kagaku Kogyo Co., Ltd.) | 39.6 parts by weight |
| Xylene | 29.7 parts by weight |
| Butanol | 1.0 part by weight |

The thus obtained paint was applied onto a transparent glass plate (having a size of 0.8 (thickness)×70 mm (width)×150 mm (length)), thereby obtaining a coating film thereon. The obtained coating film had a gloss of 91% and a linear absorption of 0.021 $\mu m^{-1}$.

Next, in order to determine the heat-resisting temperature of the coating film, there were prepared five glass plates coated with the above paint. The five coated plates were respectively placed in Geer ovens heated to 210° C., 230° C., 250° C., 270° C. and 290° C., respectively, and heat-treated therein for 15 minutes. Thereafter, the coated plates were taken out of the Geer ovens, and the hues thereof were measured. Based on the hue values measured before the heat treatment, ΔE was obtained. Further, the temperature at which the ΔE value became 1.5, was obtained from the relationship between the heat-treating temperature and ΔE. As a result, it was determined that the heat-resisting temperature of the coating film was 272° C.

Example 3

<Production of resin composition using fine yellow composite iron oxide hydroxide pigment>

0.5 g of the fine yellow composite iron oxide hydroxide pigment obtained in Example 1 and 49.5 g of polyvinyl chloride resin particles 103EP8D (tradename: produced by Nippon Zeon Co., Ltd.) were weighed, charged into a 100 cc beaker and intimately mixed together by a spatula, thereby obtaining mixed particles.

The thus obtained mixed particles were mixed with 1.0 g of calcium stearate. The obtained mixture was then gradually fed to hot rolls which were heated at 160° C. and whose clearance was set to 0.2 mm, and continuously kneaded together until a uniform resin composition was obtained. Thereafter, the obtained resin composition was separated from the hot rolls, and used as a raw material for colored resin plate.

Successively, the resin composition was interposed between surface-polished stainless steel plates, placed in a hot press heated to 180° C., and pressure-molded therein while applying a pressing force of 1 ton/cm² thereto, thereby producing a colored resin plate having a thickness of 1 mm. The obtained resin plate had a linear absorption of 0.0430 $\mu m^{-1}$ and a dispersing condition of 4.

Next, in order to determine the heat-resisting temperature of the resin composition, there were prepared five test pieces obtained by cutting the colored resin plate into 5 cm square. The five test pieces were respectively placed in hot presses heated to 185° C., 200° C., 215° C., 230° C. and 245° C., respectively, and heat-treated therein for 10 minutes while applying a pressing force of 1 ton/cm² thereto. Thereafter, the test pieces were taken out of the hot presses, and the hues thereof were measured. Based on the hue values measured before the heat treatment, ΔE was obtained. Further, the temperature at which the ΔE value became 1.5, was obtained from the relationship between the heat-treating temperature and ΔE. As a result, it was determined that the heat-resisting temperature of the resin composition was 220° C.

Example 4

<Surface-covering with hydroxide of aluminum>

450 g of the fine yellow composite iron oxide hydroxide pigment obtained in Example 1 was deaggregated in 10 liters of pure water, and further passed though a Homomic Line Mill (manufactured by Tokushu Kika Kogyo Co., Ltd.) three times, thereby obtaining a slurry containing the fine yellow composite iron oxide hydroxide particles.

Successively, the obtained slurry containing the fine yellow composite iron oxide hydroxide particles was passed through a transverse-type sand grinder mill (SGM) (Mighty Mill: manufactured by Inoue Seisakusho Co., Ltd.) five times at an axis-rotating speed of 2,000 rpm. The fine yellow composite iron oxide hydroxide particles which remained on a sieve of 325 mesh (mesh size: 44 $\mu m$) was 0%.

The concentration of the obtained slurry of the fine yellow composite iron oxide hydroxide particles was adjusted to 40 g/liter, and 10 liters of the slurry was sampled. The slurry was heated to 60° C. while stirring, and then mixed with a 6.5N-sodium hydroxide aqueous solution, thereby adjusting the pH value of the slurry to 10.5.

Next, 148 ml of a 1.0 mol/liter-sodium aluminate aqueous solution (equivalent to 1.0% by weight (calculated as Al) based on the weight of the fine yellow composite iron oxide hydroxide particles) was added to the slurry, and then the slurry was allowed to stand for 30 minutes. Thereafter, the pH value of the slurry was adjusted to 8.0 by adding acetic acid thereto, and the slurry was further allowed to stand for 30 minutes. Next, the slurry was successively subjected to filtration, washing with water, drying and pulverization, thereby obtaining a fine yellow composite iron oxide hydroxide pigment whose surface was covered with hydroxide of aluminum.

The thus obtained fine yellow composite iron oxide hydroxide pigment had an average major axial diameter of 0.0712 $\mu m$, an average minor axial diameter of 0.0112 $\mu m$, an aspect ratio of 6.4:1, a BET specific surface area of 172.1 m²/g, a geometrical standard deviation of 1.33 and a heat resistance of 281° C. The amount of the hydroxide of aluminum covered on the surfaces of the yellow composite iron oxide hydroxide particles was 0.98% by weight (calculated as Al).

<Kinds of fine goethite particles containing aluminum inside thereof>

As fine aluminum-containing goethite particles, there were prepared fine goethite particles 1 to 4 as shown in Table 1.

TABLE 1

| Kind of fine goethite particles | Production of fine goethite particles Kind of aluminum compound added | Properties of fine goethite particles | | | |
|---|---|---|---|---|---|
| | | Shape | Average major axial diameter ($\mu m$) | Average minor axial diameter ($\mu m$) | Aspect ratio (–) |
| Fine goethite particles 1 | Aluminum sulfate | Spindle-shaped | 0.0571 | 0.0093 | 6.1:1 |
| Fine goethite particles 2 | Aluminum sulfate | Acicular | 0.0758 | 0.0114 | 6.6:1 |
| Fine goethite particles 3 | Aluminum acetate | Acicular | 0.0312 | 0.0063 | 5.0:1 |
| Fine goethite particles 4 | Sodium aluminate | Acicular | 0.0916 | 0.0201 | 4.6:1 |

| Kind of fine goethite particles | Properties of fine goethite particles | | | |
|---|---|---|---|---|
| | Geometrical standard deviation (–) | BET specific surface area (m²/g) | Amount of Al contained within particles (wt. %) | Heat resistance (° C.) |
| Fine goethite particles 1 | 1.35 | 192.1 | 2.56 | 246 |
| Fine goethite particles 2 | 1.36 | 158.2 | 1.87 | 250 |
| Fine goethite particles 3 | 1.32 | 221.8 | 0.63 | 238 |
| Fine goethite particles 4 | 1.41 | 82.6 | 9.64 | 258 |

Examples 5 to 9

The same procedure as defined in Example 1 was conducted except that kind of fine aluminum-containing goethite particles, concentration of the fine goethite particles in water suspension, pH value of the water suspension upon deposition of the composite oxide hydroxide of Fe and Al, kind and amount of the aluminum compound added, kind and amount of the aqueous ferrous salt solution added, reaction temperature, pH value maintained, amount of air fed and reaction time, were changed variously, thereby depositing the composite oxide hydroxide of Fe and Al on the surfaces of fine goethite particles.

The main production conditions used are shown in Table 2, and various properties of the obtained fine yellow composite iron oxide hydroxide pigment are shown in Table 3.

TABLE 2

| Examples | Kind of fine goethite particles | Concentration of water suspension (g/liter) | Conditions of deposition of composite oxide hydroxide of Fe and Al pH value before addition of Al compound (–) |
|---|---|---|---|
| Example 5 | Fine goethite particles used in Example 1 | 50 | 5.5 |
| Example 6 | Fine goethite particles 1 | 50 | 6.0 |
| Example 7 | Fine goethite particles 2 | 50 | 5.1 |
| Example 8 | Fine goethite particles 3 | 50 | 6.3 |
| Example 9 | Fine goethite particles 4 | 50 | 8.0 |

| Examples | Kind of Al compound added | Amount of Al compound added (calculated as Al) (wt. %) | Kind of aqueous ferrous salt solution added | Amount of ferrous salt added (calculated as Fe) (wt. %) |
|---|---|---|---|---|
| Example 5 | Aluminum sulfate | 4.0 | ferrous sulfate | 8.3 |
| Example 6 | Aluminum acetate | 0.5 | ferrous sulfate | 6.2 |
| Example 7 | Aluminum acetate | 1.5 | ferrous sulfate | 12.4 |
| Example 8 | Aluminum sulfate | 3.0 | ferrous sulfate | 6.2 |
| Example 9 | Sodium aluminate | 1.0 | ferrous sulfate | 8.3 |

| Examples | Temperature (° C.) | pH value maintained (–) | Amount of air fed (liter/min) | Time (hr) |
|---|---|---|---|---|
| Example 5 | 60 | 4.1 | 75 | 2.8 |
| Example 6 | 60 | 4.1 | 75 | 2.5 |
| Example 7 | 60 | 4.1 | 75 | 3.9 |
| Example 8 | 60 | 4.1 | 75 | 2.0 |
| Example 9 | 50 | 11.6 | 70 | 2.5 |

TABLE 3

Properties of yellow composite iron oxide hydroxide particles coated with composite oxide hydroxide of Fe and Al

| Examples | Average major axial diameter (μm) | Average minor axial diameter (μm) | Aspect ratio (–) | Geometrical standard deviation (–) |
|---|---|---|---|---|
| Example 5 | 0.0710 | 0.0110 | 6.5:1 | 1.33 |
| Example 6 | 0.0572 | 0.0095 | 6.0:1 | 1.36 |
| Example 7 | 0.0763 | 0.0118 | 6.5:1 | 1.36 |
| Example 8 | 0.0312 | 0.0066 | 4.7:1 | 1.33 |
| Example 9 | 0.0918 | 0.0206 | 4.5:1 | 1.42 |

| Examples | BET specific surface area (m²/g) | Heat resistance (° C.) | Theoretical atomic ratio Al/Fe in composite oxide hydroxide (–) | Measured atomic ratio Al/Fe in composite oxide hydroxide (–) |
|---|---|---|---|---|
| Example 5 | 172.1 | 280 | 1/1 | 0.996 |
| Example 6 | 188.6 | 272 | 1/6 | 0.165 |
| Example 7 | 149.2 | 270 | 1/4 | 0.242 |
| Example 8 | 201.2 | 278 | 1/1 | 1.008 |
| Example 9 | 81.8 | 270 | 1/4 | 0.243 |

Properties of yellow composite iron oxide hydroxide particles coated with composite oxide hydroxide of Fe and Al
Composite oxide hydroxide

| Examples | Amount of Al deposited (calculated as Al) (wt. %) | Amount of Fe deposited (calculated as Fe) (wt. %) |
|---|---|---|
| Example 5 | 3.67 | 7.50 |
| Example 6 | 0.48 | 5.81 |
| Example 7 | 1.31 | 11.00 |
| Example 8 | 2.78 | 5.68 |
| Example 9 | 0.92 | 7.61 |

Examples 10 to 14

The same procedure as defined in Example 4 was conducted except that kind of the fine yellow composite iron oxide hydroxide pigment coated with composite oxide hydroxide of Fe and Al on the surface thereof, concentration of the composite iron oxide hydroxide particles in the water suspension upon covering with the hydroxide of aluminum, pH value of the water suspension before addition of the aluminum compound, kind and amount of the aluminum compound added, and final pH value of the water suspension, were changed variously, thereby obtaining a fine yellow composite iron oxide hydroxide pigment coated with the composite oxide hydroxide of Fe and Al, which was covered with the hydroxide of aluminum on the surface of the composite oxide hydroxide.

The main production conditions used are shown in Table 4, and various properties of the obtained fine yellow composite iron oxide hydroxide pigment coated with the composite oxide hydroxide of Fe and Al, which was covered with the hydroxide of aluminum on the surface of the composite oxide hydroxide, are shown in Table 5.

TABLE 4

| Examples | Kind of fine yellow composite iron oxide hydroxide particles (Example No.) | Concentration of water suspension (g/liter) | Covering with hydroxide of aluminum pH value before addition of Al compound (–) |
|---|---|---|---|
| Example 10 | Example 5 | 45 | 4.1 |
| Example 11 | Example 6 | 45 | 4.0 |
| Example 12 | Example 7 | 45 | 10.5 |
| Example 13 | Example 8 | 45 | 3.5 |
| Example 14 | Example 9 | 45 | 11.0 |

TABLE 4-continued

Covering with hydroxide of aluminum

| Examples | Aluminum compound | | Final pH value (–) |
|---|---|---|---|
| | Kind of Al compound added | Amount of Al compound added (calculated as Al) (wt. %) | |
| Example 10 | Aluminum acetate | 5.5 | 7.0 |
| Example 11 | Aluminum sulfate | 3.5 | 7.0 |
| Example 12 | Sodium aluminate | 10.0 | 7.0 |
| Example 13 | Aluminum acetate | 2.0 | 6.5 |
| Example 14 | Sodium aluminate | 10.5 | 7.5 |

TABLE 5

Properties of fine yellow composite iron oxide hydroxide particles coated with composite oxide hydroxide of Fe and Al and covered with hydroxide of aluminum

| Examples | Average major axial diameter ($\mu$m) | Average minor axial diameter ($\mu$m) | Aspect ratio (–) | Geometrical standard deviation (–) |
|---|---|---|---|---|
| Example 10 | 0.0712 | 0.0113 | 6.3:1 | 1.34 |
| Example 11 | 0.0573 | 0.0099 | 5.8:1 | 1.35 |
| Example 12 | 0.0765 | 0.0121 | 6.3:1 | 1.36 |
| Example 13 | 0.0315 | 0.0069 | 4.6:1 | 1.33 |
| Example 14 | 0.092 | 0.0204 | 4.5:1 | 1.42 |

Properties of fine yellow composite iron oxide hydroxide particles coated with composite oxide hydroxide of Fe and Al and covered with hydroxide of aluminum

| Examples | BET specific surface area (m²/g) | Amount of hydroxide of aluminum covered (calculated as Al) (wt. %) | Heat resistance (° C.) |
|---|---|---|---|
| Example 10 | 178.3 | 5.21 | 283 |
| Example 11 | 183.5 | 3.37 | 276 |
| Example 12 | 159.1 | 9.07 | 281 |
| Example 13 | 196.8 | 1.96 | 271 |
| Example 14 | 86.8 | 9.53 | 284 |

Comparative Example 1

Fine goethite particles which contained no aluminum inside thereof and were neither coated with the composite oxide hydroxide of Fe and Al nor surface-covered with the hydroxide of aluminum, were measured to determine various properties thereof. The results of the measurements are shown in Table 6.

Comparative Examples 2 and 3

Fine goethite particles which contained aluminum inside thereof but were neither coated with the composite oxide hydroxide of Fe and Al nor surface-covered with the hydroxide of aluminum, were measured to determine various properties thereof. The results of the measurements are shown in Table 6.

Comparative Example 4

Fine goethite particles containing aluminum were only subjected to a surface-covering treatment with the hydroxide of aluminum, thereby obtaining fine yellow composite iron oxide hydroxide particles. Various properties of the obtained fine yellow composite iron oxide hydroxide particles are shown in Table 6.

Comparative Example 5

(Iron oxide hydroxide obtained by the method described in Example 2 of Japanese Patent Publication (KOKOKU) No. 6-2562(1994))

A 2 mol/liter-sodium carbonate aqueous solution was added to 2 liters of a 2 mol/liter-ferric nitrate aqueous solution until the pH value of the solution reached 3, thereby preparing a transparent positive hydrated oxide sol. The obtained sol was mixed with 500 ml of a 0.05 mol/liter-aluminum nitrate aqueous solution. Then, the resultant solution was mixed with 1,150 ml of a 0.2 mol/liter-sodium dodecylbenzene-sulfonate aqueous solution to agglomerate a composite sol composed of hydrated iron oxide and aluminum oxide. The obtained composite sol was filtered, thereby obtaining a precipitate. The precipitate was repeatedly washed with ammonia water having a concentration of 0.01 to 0.02 mol/liter and filtered, thereby adjusting the pH value of the precipitate to 6.5 to 7.0. Thereafter, the obtained precipitate was further washed with 24 liters of hot water having a temperature of 60 to 70° C. and filtered, two times. Then, the obtained filter cake was dried and pulverized, thereby obtaining transparent iron oxide hydroxide particles containing aluminum oxide.

Various properties of the obtained transparent iron oxide hydroxide particles containing aluminum oxide are shown in Table 6.

Comparative Example 6

(Iron oxide hydroxide obtained by the method described in Example 1 of Japanese Patent Publication (KOKOKU) No. 55-8462(1980))

A 50 g/liter-sodium hydroxide aqueous solution was added to 500 ml of a 60 g/liter-ferric sulfate aqueous solution (calculated as $Fe_2(SO_4)_3$) until the pH value of the solution reached 12. After aging at room temperature for 23 hours, the obtained solution was further mixed with 19.4 ml of a 291 g/liter-sodium aluminate aqueous solution (calculated as $Al_2O_3$) and 6.7 ml of a 20 g/liter-sodium silicate aqueous solution (calculated as $SiO_2$). The obtained solution was charged into a stainless steel autoclave, and subjected to an autoclaving treatment at 180° C. for one hour. Meanwhile, the pH value of the solution upon the autoclaving treatment was about 13. After completion of the autoclaving treatment, the content of the autoclave was removed therefrom and then washed with water until the electric conductivity of the filtrate was reduced to not more than 100 $\mu$s/cm. The obtained product was dried at 120° C. for 4 hours in a drier and then pulverized, thereby obtaining yellow iron oxide particles in which AlOOH was contained in the form of a solid solution.

Various properties of the obtained yellow iron oxide particles in which AlOOH was contained in the form of a solid solution, are shown in Table 6.

Comparative Example 7

Fine goethite particles containing aluminum were subjected only to a surface-coating treatment with the composite oxide hydroxide of Fe and Al, thereby obtaining yellow composite iron oxide hydroxide particles. Various properties of the obtained yellow composite iron oxide hydroxide particles are shown in Table 6.

Comparative Example 8

(Yellow iron oxide hydroxide particles obtained in Example 7 of EP 0887387A2)

A wet cake (water-containing solid) of acicular iron oxide hydroxide (goethite) particles (average major axial diameter: 0.32 μm, average minor axial diameter: 0.054 μm, aspect ratio (major axial diameter/minor axial diameter): 5.9:1, BET specific surface area: 29.5 m$^2$/g) were suspended in water to prepare 20 liters of a water suspension containing the iron oxide hydroxide particles in an amount of 50 g/liter. Next, the iron oxide hydroxide particles were sufficiently dispersed in the suspension using a high-speed dissolver and a vertical-type bead mill. At this time, the pH of the suspension was adjusted to 8.6.

20 liters of the suspension was mixed with 741 ml of 0.5 mol/liter sodium alminate aqueous solution (corresponding to 1.0% by weight (calculated as Al) based on the weight of the yellow iron oxide hydroxide particles) and with 1,058 ml of a 1.4 mol/liter-ferrous sulfate aqueous solution (atomic ratio of Al to Fe added: ¼). The suspension was heated to 50° C. while passing air therethrough at a feed rate of 25 liters per minute. Thereafter, the pH value of the suspension was adjusted to 11.5 and maintained for 3 hours, thereby depositing a composite oxide hydroxide of Al and Fe on surfaces of the iron oxide hydroxide particles.

Successively, the suspension was filtered using a press filter to separate a solid component therefrom. The solid component was sufficiently water-washed by passing water therethrough, thereby obtaining a wet cake of yellow iron oxide hydroxide particles.

A part of the thus obtained wet cake was dried at 120° C. for 24 hours, and then pulverized by a free crusher (M-Z model manufactured by NARA KIKAI SEISAKUSHO CO., LTD.).

Various properties of the obtained yellow iron oxide hydroxide particles are shown in Table 6.

TABLE 6

| | Properties of fine yellow iron oxide hydroxide particles | | |
|---|---|---|---|
| Comparative Examples | Average major axial diameter (μm) | Average minor axial diameter (μm) | Aspect ratio (-) |
| Comparative Example 1 | 0.0831 | 0.0160 | 5.2:1 |
| Comparative Example 2 | 0.2310 | 0.0363 | 6.4:1 |
| Comparative Example 3 | 0.0969 | 0.0211 | 4.6:1 |
| Comparative Example 4 | 0.0989 | 0.0260 | 3.8:1 |
| Comparative Example 5 | 0.0073 | — | — |
| Comparative Example 6 | 0.4156 | 0.0639 | 6.5:1 |
| Comparative Example 7 | 0.1120 | 0.0260 | 4.3:1 |
| Comparative Example 8 | 0.32 | 0.055 | 5.8:1 |

TABLE 6-continued

| | Properties of fine yellow iron oxide hydroxide particles | |
|---|---|---|
| Comparative Examples | BET specific surface area (m$^2$/g) | Geometrical standard deviation (-) |
| Comparative Example 1 | 146.2 | 1.41 |
| Comparative Example 2 | 60.5 | 1.58 |
| Comparative Example 3 | 141.3 | 1.39 |
| Comparative Example 4 | 100.8 | 1.52 |
| Comparative Example 5 | 213.6 | 1.83 |
| Comparative Example 6 | 17.2 | 1.56 |
| Comparative Example 7 | 102.1 | 1.54 |
| Comparative Example 8 | 29.9 | 1.41 |

| | Properties of fine yellow iron oxide hydroxide particles | | | |
|---|---|---|---|---|
| Comparative Examples | Amount of Al contained within particles (wt. %) | Atomic ratio Al/Fe in composite oxide hydroxide of Fe and Al (-) | Surface-covering amount of hydroxide of aluminum (calculated as Al) (wt. %) | Heat resistance (° C.) |
| Comparative Example 1 | — | — | — | 226 |
| Comparative Example 2 | 0.64 | — | — | 242 |
| Comparative Example 3 | 1.36 | — | — | 238 |
| Comparative Example 4 | 0.28 | — | 0.13 | 235 |
| Comparative Example 5 | — | 0.19 | — | 208 |
| Comparative Example 6 | — | 14.92 | — | 258 |
| Comparative Example 7 | 0.58 | ¼ | — | 265 |
| Comparative Example 8 | — | ¼ | — | 270 |

Examples 15 to 24

The same procedure as defined in Example 2 was conducted except that kind of fine yellow composite iron oxide hydroxide pigment was changed variously, thereby obtaining a paint and a coating film.

The main production conditions used and various properties of the obtained paint are shown in Table 7.

Comparative Examples 9 to 20

The same procedure as defined in Example 2 was conducted except that kind of fine yellow iron oxide hydroxide particles was changed variously, thereby obtaining a paint and a coating film.

The main production conditions used and various properties of the obtained paint are shown in Table 8.

TABLE 7

Production of paint

| Examples | Kinds of fine yellow composite iron oxide hydroxide particles (Example No.) | Kinds of resins | Properties of paint Viscosity (cP) |
|---|---|---|---|
| Example 15 | Example 5 | Amino-alkyd resin | 2,048 |
| Example 16 | Example 6 | Amino-alkyd resin | 2,560 |
| Example 17 | Example 7 | Amino-alkyd resin | 1,920 |
| Example 18 | Example 8 | Amino-alkyd resin | 2,509 |
| Example 19 | Example 9 | Amino-alkyd resin | 1,792 |
| Example 20 | Example 10 | Amino-alkyd resin | 1,997 |
| Example 21 | Example 11 | Amino-alkyd resin | 2,124 |
| Example 22 | Example 12 | Amino-alkyd resin | 1,741 |
| Example 23 | Example 13 | Amino-alkyd resin | 2,099 |
| Example 24 | Example 14 | Amino-alkyd resin | 1,690 |

Properties of coating film

| | 20° Gloss (%) | Heat-resisting temperature of coating film (° C.) | Transparency of coating film (linear absorption) ($\mu m^{-1}$) |
|---|---|---|---|
| Example 15 | 96 | 275 | 0.0248 |
| Example 16 | 109 | 265 | 0.0203 |
| Example 17 | 98 | 267 | 0.0231 |
| Example 18 | 110 | 261 | 0.0153 |
| Example 19 | 89 | 270 | 0.0246 |
| Example 20 | 101 | 279 | 0.0188 |
| Example 21 | 113 | 273 | 0.0097 |
| Example 22 | 100 | 278 | 0.0125 |
| Example 23 | 114 | 269 | 0.0087 |
| Example 24 | 93 | 281 | 0.0136 |

TABLE 8

Production of paint

| Comparative Examples | Kinds of yellow iron oxide hydroxide particles (Example No.) | Kinds of resins | Properties of paint Viscosity (cP) |
|---|---|---|---|
| Comparative Example 9 | Comparative Example 1 | Amino-alkyd resin | 2,688 |
| Comparative Example 10 | Comparative Example 2 | Amino-alkyd resin | 1,997 |
| Comparative Example 11 | Comparative Example 3 | Amino-alkyd resin | 2,816 |
| Comparative Example 12 | Comparative Example 4 | Amino-alkyd resin | 2,304 |
| Comparative Example 13 | Comparative Example 5 | Amino-alkyd resin | 11,982 |
| Comparative Example 14 | Comparative Example 6 | Amino-alkyd resin | 1,024 |
| Comparative Example 15 | Comparative Example 7 | Amino-alkyd resin | 5,626 |
| Comparative Example 16 | Comparative Example 8 | Amino-alkyd resin | 2,682 |
| Comparative Example 17 | Fine goethite particles 1 | Amino-alkyd resin | 2,636 |
| Comparative Example 18 | Fine goethite particles 2 | Amino-alkyd resin | 3,200 |
| Comparative Example 19 | Fine goethite particles 3 | Amino-alkyd resin | 2,944 |
| Comparative Example 20 | Fine goethite particles 4 | Amino-alkyd resin | 2,586 |

Properties of coating film

| Comparative Examples | 20° Gloss (%) | Heat-resisting temperature of coating film (° C.) | Transparency of coating film (linear absorption) ($\mu m^{-1}$) |
|---|---|---|---|
| Comparative Example 9 | 75 | 226 | 0.0512 |
| Comparative Example 10 | 63 | 243 | 0.1032 |
| Comparative Example 11 | 73 | 243 | 0.0636 |
| Comparative Example 12 | 70 | 238 | 0.0681 |
| Comparative Example 13 | 16 | 210 | 0.0381 |
| Comparative Example 14 | 76 | 257 | 0.2268 |
| Comparative Example 15 | 82 | 266 | 0.0561 |
| Comparative Example 16 | 73 | 271 | 0.3862 |
| Comparative Example 17 | 78 | 246 | 0.0352 |
| Comparative Example 18 | 73 | 248 | 0.0312 |
| Comparative Example 19 | 76 | 237 | 0.0301 |
| Comparative Example 20 | 70 | 253 | 0.0365 |

Examples 25 to 34

The same procedure as defined in Example 3 was conducted except that kind of fine yellow composite iron oxide hydroxide pigment was changed variously, thereby obtaining a resin composition using the fine yellow composite iron oxide hydroxide pigment.

The main production conditions used and various properties of the obtained resin composition are shown in Table 9.

Comparative Examples 21 to 32

The same procedure as defined in Example 3 was conducted except that kind of yellow iron oxide hydroxide particles was changed variously, thereby obtaining a resin composition using the yellow iron oxide hydroxide particles.

The main production conditions used and various properties of the obtained resin composition are shown in Table 10.

TABLE 9

Production of resin composition

| Fine yellow composite iron oxide hydroxide particles | | Resin |
|---|---|---|
| Kind (Example | Amount (part by | Amount (part by |

TABLE 9-continued

| Examples | No.) | weight) | Kind | weight) |
|---|---|---|---|---|
| Example 25 | Example 5 | 1.0 | Polyvinyl chloride resin | 99.0 |
| Example 26 | Example 6 | 1.0 | Polyvinyl chloride resin | 99.0 |
| Example 27 | Example 7 | 1.0 | Polyvinyl chloride resin | 99.0 |
| Example 28 | Example 8 | 1.0 | Polyvinyl chloride resin | 99.0 |
| Example 29 | Example 9 | 1.0 | Polyvinyl chloride resin | 99.0 |
| Example 30 | Example 10 | 1.0 | Polyvinyl chloride resin | 99.0 |
| Example 31 | Example 11 | 1.0 | Polyvinyl chloride resin | 99.0 |
| Example 32 | Example 12 | 1.0 | Polyvinyl chloride resin | 99.0 |
| Example 33 | Example 13 | 1.0 | Polyvinyl chloride resin | 99.0 |
| Example 34 | Example 14 | 1.0 | Polyvinyl chloride resin | 99.0 |

| | Production of resin composition | |
|---|---|---|
| | Additives | |
| Examples | Kind | Amount (part by weight) | Kneading temperature (° C.) |
|---|---|---|---|
| Example 25 | Calcium stearate | 2.0 | 160 |
| Example 26 | Calcium stearate | 2.0 | 160 |
| Example 27 | Calcium stearate | 2.0 | 160 |
| Example 28 | Calcium stearate | 2.0 | 160 |
| Example 29 | Calcium stearate | 2.0 | 160 |
| Example 30 | Calcium stearate | 2.0 | 160 |
| Example 31 | Calcium stearate | 2.0 | 160 |
| Example 32 | Calcium stearate | 2.0 | 160 |
| Example 33 | Calcium stearate | 2.0 | 160 |
| Example 34 | Calcium stearate | 2.0 | 160 |

| | Properties of resin composition | | |
|---|---|---|---|
| Examples | Dispersing condition (–) | Heat-resisting temperature of resin composition (° C.) | Transparency of resin composition (linear absorption) ($\mu m^{-1}$) |
| Example 25 | 4 | 221 | 0.0428 |
| Example 26 | 4 | 213 | 0.0416 |
| Example 27 | 3 | 218 | 0.0481 |
| Example 28 | 4 | 221 | 0.0362 |
| Example 29 | 5 | 225 | 0.0431 |
| Example 30 | 5 | 228 | 0.0312 |
| Example 31 | 5 | 220 | 0.0211 |
| Example 32 | 4 | 225 | 0.0216 |
| Example 33 | 5 | 228 | 0.0189 |
| Example 34 | 5 | 228 | 0.0222 |

TABLE 10

| | Production of resin composition | | | |
|---|---|---|---|---|
| | Yellow iron oxide | | hydroxide particles Resin | |
| Comparative Examples | Kind (Example No.) | Amount (part by weight) | Kind | Amount (part by weight) |
| Comparative Example 21 | Comparative Example 1 | 1.0 | Polyvinyl chloride resin | 99.0 |
| Comparative Example 22 | Comparative Example 2 | 1.0 | Polyvinyl chloride resin | 99.0 |
| Comparative Example 23 | Comparative Example 3 | 1.0 | Polyvinyl chloride resin | 99.0 |
| Comparative Example 24 | Comparative Example 4 | 1.0 | Polyvinyl chloride resin | 99.0 |
| Comparative Example 25 | Comparative Example 5 | 1.0 | Polyvinyl chloride resin | 99.0 |
| Comparative Example 26 | Comparative Example 6 | 1.0 | Polyvinyl chloride resin | 99.0 |
| Comparative Example 27 | Comparative Example 7 | 1.0 | Polyvinyl chloride resin | 99.0 |
| Comparative Example 28 | Comparative Example 8 | 1.0 | Polyvinyl chloride resin | 99.0 |
| Comparative Example 29 | Fine goethite particles 1 | 1.0 | Polyvinyl chloride resin | 99.0 |
| Comparative Example 30 | Fine goethite particles 2 | 1.0 | Polyvinyl chloride resin | 99.0 |
| Comparative Example 31 | Fine goethite particles 3 | 1.0 | Polyvinyl chloride resin | 99.0 |
| Comparative Example 32 | Fine goethite particles 4 | 1.0 | Polyvinyl chloride resin | 99.0 |

| | Production of resin composition | | |
|---|---|---|---|
| | Additives | | |
| Comparative Examples | Kind | Amount (part by weight) | Kneading temperature (° C.) |
| Comparative Example 21 | Calcium stearate | 2.0 | 160 |
| Comparative Example 22 | Calcium stearate | 2.0 | 160 |
| Comparative Example 23 | Calcium stearate | 2.0 | 160 |
| Comparative Example 24 | Calcium stearate | 2.0 | 160 |
| Comparative Example 25 | Calcium stearate | 2.0 | 160 |
| Comparative Example 26 | Calcium stearate | 2.0 | 160 |
| Comparative Example 27 | Calcium stearate | 2.0 | 160 |
| Comparative Example 28 | Calcium stearate | | |

TABLE 10-continued

| Comparative Examples | Dispersing condition (–) | Heat-resisting temperature of resin composition (° C.) | Transparency of resin composition (linear absorption) ($\mu m^{-1}$) |
|---|---|---|---|
| Comparative Example 29 | Calcium stearate | 2.0 | 160 |
| Comparative Example 30 | Calcium stearate | 2.0 | 160 |
| Comparative Example 31 | Calcium stearate | 2.0 | 160 |
| Comparative Example 32 | Calcium stearate | 2.0 | 160 |

Properties of resin composition

| Comparative Examples | Dispersing condition (–) | Heat-resisting temperature of resin composition (° C.) | Transparency of resin composition (linear absorption) ($\mu m^{-1}$) |
|---|---|---|---|
| Comparative Example 21 | 1 | 191 | 0.0821 |
| Comparative Example 22 | 1 | 186 | 0.1565 |
| Comparative Example 23 | 2 | 190 | 0.0936 |
| Comparative Example 24 | 2 | 192 | 0.1023 |
| Comparative Example 25 | 1 | 176 | 0.0612 |
| Comparative Example 26 | 2 | 208 | 0.3165 |
| Comparative Example 27 | 3 | 212 | 0.0632 |
| Comparative Example 28 | 3 | 210 | 0.4163 |
| Comparative Example 29 | 2 | 190 | 0.0712 |
| Comparative Example 30 | 2 | 193 | 0.0696 |
| Comparative Example 31 | 2 | 190 | 0.0632 |
| Comparative Example 32 | 2 | 195 | 0.0712 |

What is claimed is:

1. A fine yellow composite iron oxide hydroxide pigment having an average major axial diameter of not less than 0.005 $\mu m$ and less than 0.1 $\mu m$, comprising:
   fine goethite particles as core particles, containing aluminum inside thereof in an amount of 0.05 to 50% by weight, calculated as Al, based on the weight of said core particles; and
   a composite oxide hydroxide of Fe and Al, coated on the surface of each core particle.

2. A fine yellow composite iron oxide hydroxide pigment according to claim 1, wherein the amount of Al in said composite oxide hydroxide is 0.1 to 10% by weight, calculated as Al, based on the weight of said core particles; and the amount of Fe in said composite oxide hydroxide is 0.1 to 30% by weight, calculated as Fe, based on the weight of said core particles.

3. A fine yellow composite iron oxide hydroxide pigment according to claim 1, which further has an average minor axial diameter of not less than 0.0025 $\mu m$ and less than 0.05 $\mu m$, and an aspect ratio (average major axial diameter/average minor axial diameter) of not more than 20:1.

4. A fine yellow composite iron oxide hydroxide pigment according to claim 1, which further has a BET specific surface area of 50 to 300 $m^2/g$ and a geometrical standard deviation of the average major axial diameter of not more than 1.8.

5. A fine yellow composite iron oxide hydroxide pigment according to claim 1, which further comprise a hydroxide of aluminum covered on the surface of said composite oxide hydroxide, in an amount of 0.1 to 20% by weight, calculated as Al, based on the total weight of said pigment.

6. A fine yellow composite iron oxide hydroxide pigment according to claim 1, wherein the average major axial diameter is 0.01 to 0.09 $\mu m$.

7. A fine yellow composite iron oxide hydroxide pigment according to claim 1, wherein the ratio of Al to Fe in said composite oxide hydroxide is 1:0.5 to 1:20, calculated as Al and Fe atoms.

8. A process for producing a fine yellow composite iron oxide hydroxide pigment, comprising:
   (i) adding an aluminum compound and a ferrous salt compound to a water suspension containing fine goethite particles containing aluminum inside thereof in an amount of 0.05 to 50% by weight, calculated as Al, based on the weight of said core particles, and having an average major axial diameter of not less than 0.005 $\mu m$ and less than 0.1 $\mu m$, while stirring; and
   (ii) passing an oxygen-containing gas through the resultant dispersion to coat a composite oxide hydroxide of Fe and Al on surfaces of said fine goethite particles.

9. A paint comprising a paint base material and the pigment according to claim 1.

10. A paint according to claim 9, wherein the content of said pigment is 0.5 to 100 parts by weight based on 100 parts by weight of said paint base material.

11. A rubber or resin composition comprising a rubber or resin base material and the pigment according to claim 1.

12. A rubber or resin composition according to claim 11, wherein the content of said pigment is 0.01 to 50 parts by weight based on 100 parts by weight of said rubber or resin.

13. Composite iron oxide hydroxide particles having an average major axial diameter of not less than 0.005 $\mu m$ and less than 0.1 $\mu m$, comprising:
   fine goethite particles as core particles containing aluminum inside thereof in an amount of 0.05 to 50% by weight, calculated as Al, based on the weight of said core particles; and
   a comprising composite oxide hydroxide of Fe and Al being deposited on the surface of each core particle.

* * * * *